United States Patent
Patel

(10) Patent No.: US 8,743,782 B1
(45) Date of Patent: Jun. 3, 2014

(54) AUTOMATED METHOD TO DETERMINE POSITION OF WI-FI ACCESS POINT TO ENABLE LOCATION BASED SERVICES

(75) Inventor: Biren A. Patel, San Ramon, CA (US)

(73) Assignee: Cellco Partnership, Basking Ridge, NJ (US)

( * ) Notice: Subject to any disclaimer, the term of this patent is extended or adjusted under 35 U.S.C. 154(b) by 565 days.

(21) Appl. No.: 12/949,508

(22) Filed: Nov. 18, 2010

(51) Int. Cl.
*H04W 4/00* (2009.01)

(52) U.S. Cl.
USPC .......................................................... 370/328

(58) Field of Classification Search
USPC ................. 370/328, 908, 310–311, 912–913; 455/456.1
See application file for complete search history.

(56) References Cited

U.S. PATENT DOCUMENTS

| | | | |
|---|---|---|---|
| 2005/0037775 A1* | 2/2005 | Moeglein et al. | 455/456.1 |
| 2005/0227709 A1* | 10/2005 | Chang et al. | 455/456.1 |
| 2007/0149211 A1* | 6/2007 | Dunn et al. | 455/456.1 |
| 2009/0005061 A1* | 1/2009 | Ward et al. | 455/456.1 |
| 2009/0312035 A1* | 12/2009 | Alizadeh-Shabdiz | 455/456.1 |
| 2009/0319616 A1* | 12/2009 | Lewis et al. | 709/206 |
| 2010/0150117 A1* | 6/2010 | Aweya et al. | 370/338 |
| 2010/0273506 A1* | 10/2010 | Stern-Berkowitz et al. | 455/456.1 |

* cited by examiner

*Primary Examiner* — Yong Zhou

(57) ABSTRACT

A user initiates a request for determination of position of a mobile device in an area where there is no GPS signal. The position of the mobile device is determined by using cell tower triangulation methods using the wireless operator network. If the mobile device is in communication with a wireless local area network access point, the mobile device provides information about the address of the wireless local area network access points within range and the signal strength of the wireless access points. The server then stores the determined position in a database in connection with each address and signal strength provided by the wireless local area network access point. Thus the position of the wireless local area network access point has now been recorded and can be used in the future to determine the position of a mobile device.

15 Claims, 3 Drawing Sheets

AUTOMATED METHOD TO DETERMINE POSITION OF WI-FI ACCESS POINT TO ENABLE LOCATION BASED SERVICES

TECHNICAL FIELD

The present subject matter relates to techniques and equipment to obtain information as to position of a wireless local area network access point, e.g. for use in location based services.

BACKGROUND

In recent years, mobile communications have become ubiquitous, in many countries, for voice and various data services via mobile handset or smartphone type devices as well as for wireless communications for portable data devices like netbook and laptop personal computers. There are situations where it is desirable to determine the position of a mobile device, and various industry players have developed technologies to meet such demands. For example, in the US today, most mobile devices are equipped with Global Positioning System (GPS) receivers/processors sufficient to enable emergency services to obtain information as to the position of a device as part of the processing of an emergency call, e.g., to 911. The advanced positioning capabilities of such mobile devices, however, have also enabled service providers to offer location based services and applications today, some of which allow a user of a mobile device to learn their present position and possibly obtain information about that locale and/or related navigation information, via the mobile device itself.

Wireless carriers use various location determination methods today. Many of the current techniques require prior knowledge of locations of wireless network equipment that may be sending and/or receiving transmissions over the air to/from a mobile station seeking a position determination. A knowledge base or database of cell site and/or sector information is sometimes referred to as a base station almanac or "BSA." Some location determination methods (e.g., Advanced Forward Link Trilateration (AFLT)) require accurate and complete BSA information. The network may also offer assistance to the mobile station in a GPS type position determination based in part on an initial position determination from identification of one or more base stations detectable by the mobile station and position information about the detectable base station(s) from the BSA.

Determination of the position of a mobile device has many useful applications. For example, a "where am I" type location based service is useful in navigation. Another example is a "where is my child" service whereby a parent can determine the position of the mobile device of her or his child. Wireless/mobile communication networks offer a number of standard technologies to support position determinations for these location based services as well as position determinations for emergency services like 911. In many cases, the position determination is based on global positioning satellite GPS signal processing, either by the mobile device alone or with some assistance via the network. However, GPS may not be available in certain areas, such as urban canyons, inside large buildings, and the like, where a device may be unable to detect signals from a sufficient number of GPS satellites. Another method of position determination, AFLT, involves triangulation using base station identification and strength of signals that the device receives from cell towers. However, the AFLT method tends to be costly.

In addition to the services available from wireless/mobile communication networks, many localities also offer wireless Internet access via wireless local area network (WLAN) technologies. A WLAN uses over the air transmission of radio signals to communicate with at least some devices. A WLAN provides flexible network connectivity, making it possible for mobile data users to stay connected as they move freely within a building, around a campus, or in public hot spots (e.g. airports, hotels, and other public spaces). Wi-Fi (or sometimes WiFi) is a trademark of the Wi-Fi Alliance, which is used describe wireless connectivity technologies for a WLAN based on the IEEE 802.11 standards. Although originally developed for data applications, like web browsing, document sharing and email, the broadband packet communication connectivity of Wi-Fi and other types of WLAN can also be used for real-time streaming media communications like voice calls video conferencing. Increasingly, mobile devices can operate via Wi-Fi as an alternative to the wireless/mobile communication network, for example, when Wi-Fi may be cheaper or when a user is at an area that receives poor or no service from a wireless/mobile communication network.

Incorporation of Wi-Fi communications presents additional issues with regard to consistent accurate position determination. When operating via a Wi-Fi access point, it may still be possible to use GPS or AFLT to determine position. However, as noted GPS may not always be available and AFLT tends to be costly. Another approach to position determination involves the use of Wi-Fi, which is much cheaper than AFLT. Each Wi-Fi access point has a unique Media Access Control (MAC) address associated with it, and readable by mobile devices in the vicinity of the Wi-Fi access point. Thus, if the position of a particular Wi-Fi access point and its MAC address are known, a location service can look-up the position of a mobile device using the MAC of the Wi-Fi access point. With this later approach to position determination through Wi-Fi, the issue becomes obtaining position information and MAC addresses with regard to the many Wi-Fi access points, both public and private, deployed across various geographic regions.

Currently, correlation of MAC addresses and position information for Wi-Fi access points is done in two ways. Both rely on collecting the precise position of a Wi-Fi access point using GPS. In one approach, the company that builds a database of Wi-Fi access points (e.g., Google) puts scanning devices on vehicles and drives the vehicles on roads while tracking GPS position. As such a device scans for MAC addresses, it records the address and signal strength of each detected access point together with the corresponding position data in a database. In the other approach, software probes are bundled with location enabled applications installed on mobile devices (e.g., Google Maps) to cause the mobile devices to scan for MAC addresses and send addresses back to a server with the GPS coordinates of the mobile device. Since all wireless handsets support GPS due to government e911 mandate, all new handsets have GPS receivers.

The two methods described above require GPS access to associate a MAC address with a position (e.g., latitude and longitude coordinates). As noted earlier, there are areas where GPS may not be available to provide the position data to associate with a MAC address of a detected Wi-Fi access point.

SUMMARY

The teachings herein relate to improved technologies and methods to obtain position information and correlate that information with an address of a wireless local area network access point, for a later position determination for any mobile device that may communicate via the access point.

An exemplary method may involve receiving a request for position determination while the mobile device is in the vicinity of a WLAN access point transmitting a signal, such as a Wi-Fi access point and obtaining information about signals of base stations detected by the mobile device. This information is processed to determine the position of the mobile device. The method may further entail storing the position of the mobile device in a location information database in association with an address of the WLAN access point.

For example, the address of the access point may be obtained by the mobile device detecting a signal transmitted from the access point and carrying the access point address. The location determination may use via AFLT based on the signals detected from mobile network base stations.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Determination of position of mobile devices may be useful in a number of scenarios, such as navigation, tracking of minors or other individuals, and/or other location based service offered through a wide area mobile communication network. The methods of the present disclosure may associate Wi-Fi access points with information as to position, through the use of a mobile device, where GPS is unavailable. Such methods may use trilateration of signals obtained from nearby cell towers.

Figure 1:
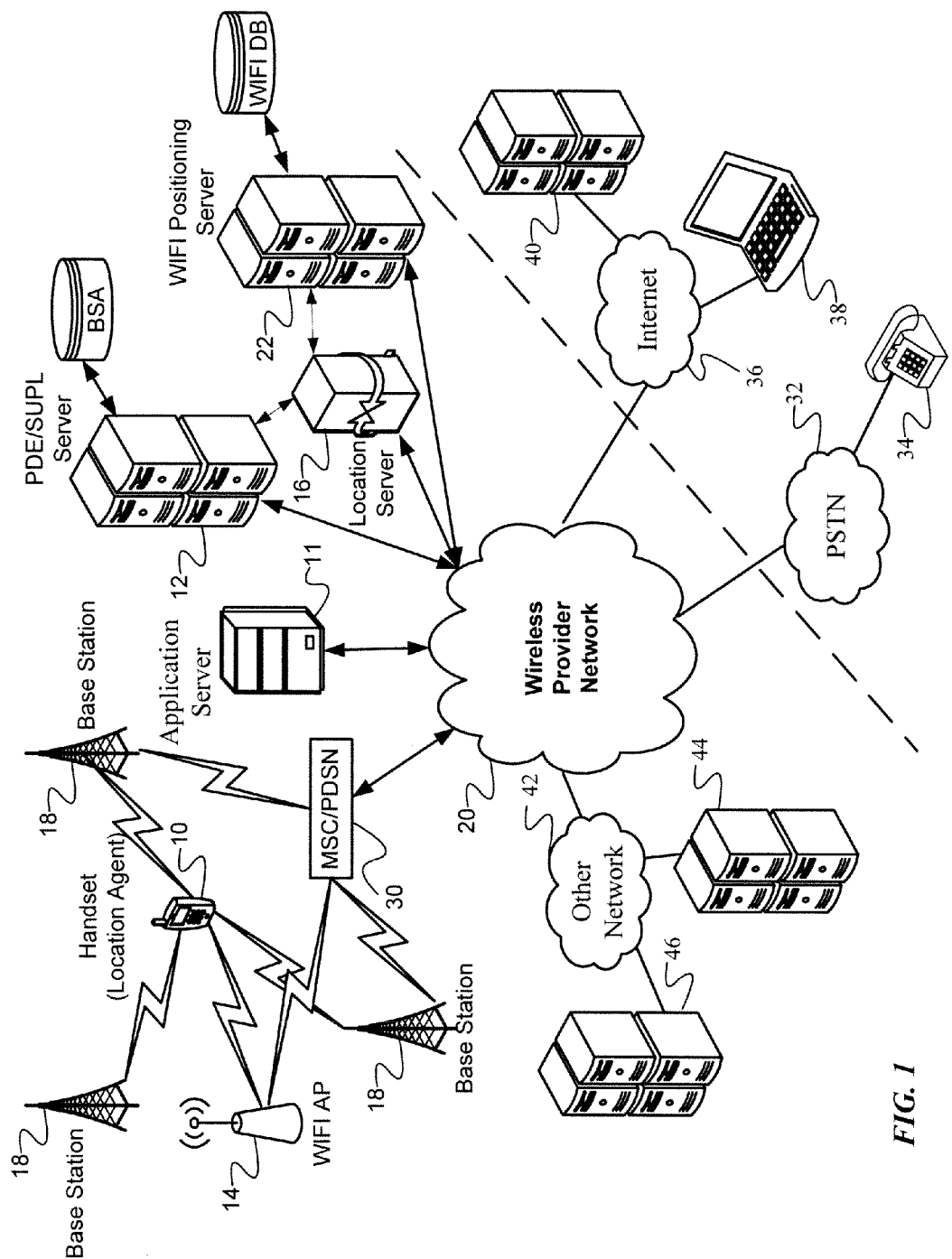
FIG. 1 is a high level functional block diagram, useful in explaining mobile stations, network elements and other components that may be involved in position determination.

Reference now is made in detail to the examples illustrated in the accompanying drawings and discussed below. Referring now to FIG. 1, a request for determination of position may be initiated remotely by a party authorized to access information as to the position of the mobile device 10, or the request for determination of position may be initiated from mobile device 10. For discussion purposes, we will consider an example of a remote request for position determination. For example, a parent may initiate a request to determine the current position of mobile device 10 via an application server 11, and thus any child possessing the device. Such request may be initiated from a mobile station, computer or other terminal device of the parent. The request goes to a location server 16 coupled for communication through a wide area mobile communications network, which sends a request to an application referred to as "Location Agent" on the mobile device 10 (e.g., via Short Message Service (SMS) or User Datagram Protocol (UDP)) to activate position determination software on the mobile device 10.

Once the position determination software on the mobile device 10 is activated, mobile device 10 initiates a precise positioning request with a mobile positioning center. The location agent on mobile device 10 may ascertain position of mobile device 10 using a location protocol (e.g., IS-801 or Secure User Plane Location (SUPL)) with network server 12. Network server 12 may be, for example, a Position Determining Entity (PDE), or a SUPL server. The PDE/SUPL server is a network element that manages the position or geographic location determination of each mobile station. In an assisted GPS (A-GPS) type deployment, for example, the PDE or SUPL server provides data to a mobile device to expedite satellite acquisition; and the server may determine the actual latitude and longitude (final fix) of a mobile device based on GPS measurements taken by the mobile device at the PDE/SUPL server's request. For AFLT (e.g. when GPS is unavailable), the PDE or SUPL server receives identifications and signal strength measurements regarding network base stations detectable by the mobile station and processes that data to obtain a fix on the location of the mobile station.

If GPS or A-GPS coverage is unavailable to mobile device 10, the precise positioning request fails and the mobile device 10 and the network server 12 initiate a positioning calculation using non GPS methods. In a long term evolution (LTE) based network, this processing may be done using Enhanced Cell ID (ECID) or Observed Time Difference of Arrival (OT-DOA). In the code division multiple access/evolution data optimized (CDMA/EVDO) network this may be done using AFLT. Upon failure of the precise positioning request or in parallel to the mobile device 10 interacting with network server 12 to calculate position, mobile device 10 searches for nearby Wi-Fi access points 14 and sends MAC information about any detected Wi-Fi access points 14 to Wi-Fi positioning server 22. Wi-Fi positioning server 22 compares the unique MAC address to a location information database in or otherwise accessible to Wi-Fi positioning server 22 to determine whether the MAC address is associated with a known position.

At this point in our example, the mobile station position has been determined, but an access point that the station detected and may have been using for other communication purposes was not listed with its position information in the Wi-Fi database. Other access points may be within range of the mobile station. Once the position of mobile device 10 has been computed, or while position is being determined, mobile device 10 may scan visible Wi-Fi access points 14 for MAC address (if not already determined), and signal strength (e.g. received signal strength indicator (RSSI)). Mobile device 10 then sends the MAC address, RSSI for each access point within range to location server 16. The mobile station 10 will also send its position (e.g., position coordinates) to the server, which, in some instances may verify a position of a particular Wi-Fi access point. The location server 16 will store the access point identification(s) together with the position information in the location information database in Wi-Fi positioning server 22, to indicate the position of Wi-Fi access points 14 for future location determinations.

As the process is repeated for position requests, the location information database in Wi-Fi positioning server 22 becomes populated. Thus, location server 16 can answer future position requests containing particular MAC addresses associated with a particular Wi-Fi access point with position information that has been obtained by the methods described above even in locations where there is no GPS signal and on devices and networks where AFLT/OTDOA/ECID are not supported purely based on Wi-Fi positioning methods.

FIG. 1 further illustrates other components of a system offering a variety of mobile communication services, including communications by mobile device users. The present techniques may be implemented in any of a variety of available mobile networks 20 and/or on any type of mobile device compatible with such a network 20, and the drawing shows a very simplified example of a few relevant elements of the network 20 for purposes of discussion here. The device 10 is an example of a mobile device that may be used for various mobile services. However, the network will provide similar communications for many other similar users. The network 20 provides mobile wireless communications services to the mobile device 10 as well as to other mobile devices (not shown), for example, via a number of base stations 18 in cells and one or more mobile switching centers (MSCs) or Packet Data Serving Nodes (PDSNs) 30 to provide mobile wireless communication services to mobile stations operating within areas or regions served by the radio coverage of the individual macro network base stations. The MSC handles call routing and may provide special service features for mobile stations. Older versions of the MSC provide circuit switched communications to/from mobile stations and other networks or elements, although newer switching systems utilize packet switching technologies. Each wireless service provider's network typically includes a base station controller (BSC) or radio network controller (RNC) functionality that controls the functions of a number of the base stations and helps to manage how radio communications of each mobile station are transferred (or "handed-off") from one serving base station to another. This functionality may reside in a separate network element or may be implemented as part of their switch that forms the MSC. In LTE embodiments, PDSNs are replaced with packet data network gateways (PGWs), and base stations 18 are replaced with evolved node B (eNodeB) elements, which may also perform the function of the RNC.

For packet data communications, the traffic network supports two-way packet communication of mobile station traffic between the base stations and a PDSN. The PDSN serves as a router for mobile station communications. The PDSN establishes, maintains and terminates logical links to the associated portion of the radio access network. The PDSN also supports point-to-point protocol (PPP) user data sessions with the mobile stations. The PDSN provides the packet routing function from the radio network formed by base stations and traffic network to/from other packet switched networks.

The wireless mobile communication network 20 might be implemented as a network conforming to the CDMA IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for mobile wireless communications. The mobile device 10 may be capable of voice telephone communications through the network 20, the exemplary mobile device 10 is capable of data communications through the particular type of network 20 (and the users thereof typically will have subscribed to data service through the network).

The network 20 allows users of the mobile devices such as 10 (and other devices not shown) to initiate and receive telephone calls to each other as well as through the public switched telephone network (PSTN) 32 and telephone stations 34 connected to the PSTN. The network 20 typically offers a variety of data services via the Internet 36, such as downloads, web browsing, email, etc. By way of example, the drawing shows a laptop PC type user terminal 38 as well as a server 40 connected to the Internet 36; and the data services for the mobile device 10 via the Internet 36 may be with devices like those shown at 38 and 40 as well as with a variety of other types of devices or systems capable of data communications through various interconnected networks. The mobile device 10 of the user can receive and execute applications written in various programming languages.

Mobile device 10 can take the form of a portable handset, smart-phone or personal digital assistant, although mobile device 10 may be implemented in other form factors. Program applications, including an application to assist in the input of data can be configured to execute on many different types of mobile devices 10. For example, a mobile device application can be written to execute on a binary runtime environment for mobile (BREW-based) mobile device, a Windows Mobile based mobile device, Android, I-Phone, Java Mobile, or RIM based mobile device such as a BlackBerry or the like. Some of these types of devices can employ a multi-tasking operating system.

The mobile communication network 20 can be implemented by a number of interconnected networks. Hence, the overall network 20 may include a number of radio access networks (RANs), as well as regional ground networks interconnecting a number of RANs and a wide area network (WAN) interconnecting the regional ground networks to core network elements. A regional portion of the network 20, such as that serving mobile device 10, can include one or more RANs and a regional circuit and/or packet switched network and associated signaling network facilities.

Physical elements of a RAN operated by one of the mobile service providers or carriers, include a number of base stations represented in the example by the base stations 18. Although not separately shown, such a base station 18 can include a base transceiver system (BTS), which can communicate via an antennae system at the site of base station and over the airlink with one or more mobile devices 10, when the mobile device 10 is within range, i.e. operating within the coverage area of the cell. Each base station can include a BTS coupled to several antennae mounted on a radio tower within a coverage area often referred to as a "cell." The BTS is the part of the radio network that sends and receives RF signals to/from the mobile device 10 that is served by the base station 18.

The radio access networks can also include a traffic network represented generally by the cloud at 20, which carries the user communications and data for the mobile device 10 between the base stations 18 and other elements with or through which the mobile devices communicate. The network can also include other elements that support functionality other than device-to-device media transfer services such as messaging service messages and voice communications. Specific elements of the network 20 for carrying the voice and data traffic and for controlling various aspects of the calls or sessions through the network 20 are omitted here for simplicity. It will be understood that the various network elements can communicate with each other and other aspects of the mobile communications network 20 and other networks (e.g., the PSTN and the Internet) either directly or indirectly.

The carrier will also operate a number of systems that provide ancillary functions in support of the communications services and/or application services provided through the network 20, and those elements communicate with other nodes or elements of the network 20 via one or more private IP type packet data networks 42 (sometimes referred to as an Intranet), i.e., a private networks. Generally, such systems are part of or connected for communication via the private network 42. A person skilled in the art, however, would recognize that systems outside of the private network could serve the same functions as well. Examples of such systems, in this case operated by the network service provider as part of the overall network 20, which communicate through the intranet type network 42, include one or more application servers 44 and a related authentication server 46 for the application service of application server 44.

The mobile device 10 communicates over the air with a base station 18 and through the traffic network 20 for various voice and data communications, e.g. through the Internet 36 with a server 40 and/or with application server 44. If the mobile service carrier offers a particular service, the service may be hosted on a carrier operated application server 44, for communication via the networks 20 and 42. Alternatively, the particular service may be provided by a separate entity (alone or through agreements with the carrier), in which case, the service may be hosted on an application server such as server 40 connected for communication via the networks 20 and 36. Servers such as 40 and 44 may provide any of a variety of common application or service functions in support of or in addition to an application program running on the mobile device 10. However, for purposes of further discussion, we will focus on functions thereof in support of the mobile service. For a given service, an application program within the mobile device may be considered as a client and the programming at 40 or 44 may be considered as the server application for the particular service.

To insure that the application service offered by application server 44 is available to only authorized devices/users, the provider of the application service also deploys an authentication server 46. The authentication server 46 could be a separate physical server as shown, or authentication server 46 could be implemented as another program module running on the same hardware platform as the application server 44. When the application server (server 44 in our example) receives a service request from a client application on a mobile device 10, the server application provides appropriate information to the authentication server 46 to allow authentication server 46 to authenticate the mobile device 10 as outlined herein. Upon successful authentication, the authentication server 46 informs the application server 44, which in turn provides access to the service via data communication through the various communication elements (e.g. 18, 20 and 42) of the system. A similar authentication function may be provided for other service(s) offered via the server 40, either by the authentication server 46 if there is an appropriate arrangement between the carrier and the operator of server 40, by a program on the server 40 or via a separate authentication server (not shown) connected to the Internet 36.

The techniques to obtain information as to position of a wireless local area network access point, under consideration here, may be implemented by execution of programming in one or more of the servers discussed above relative to FIG. 1. The programming may be pre-installed in the appropriate server device(s) or the programming may be downloaded to and/or stored in the server(s) from other platforms, either for an initial installation or to upgrade previously installed programming.

Figure 2:
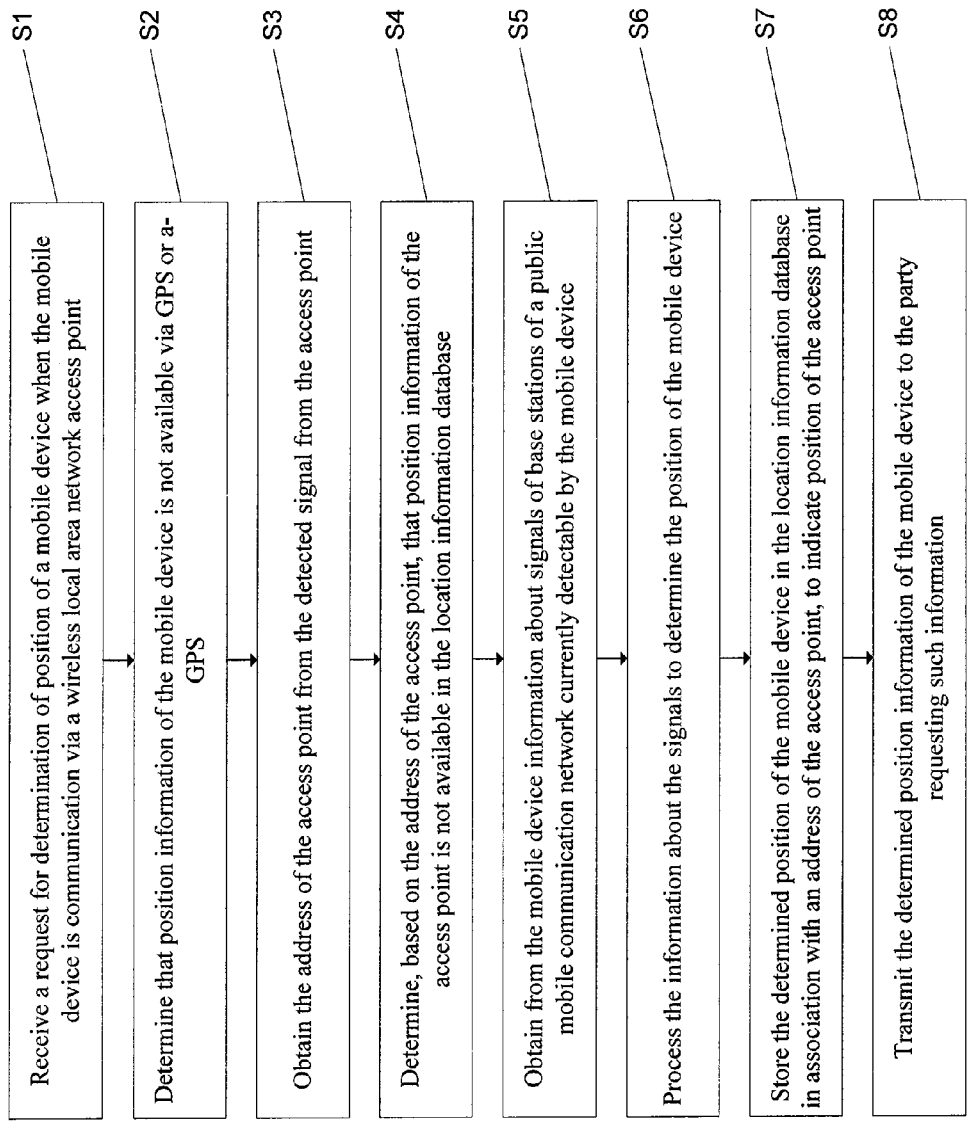
FIG. 2 is a flow chart of an exemplary method for associating position information with an access point of a wireless local area network.

Referring now to FIG. 2, at step S1, location server 16 receives a request for determination of position of mobile device 10 when mobile device 10 is in communication via Wi-Fi access point 14 or other local area network access point. The request for determination of position of mobile device 10 may relate to a location based service offered through a wide area mobile communication network. The request for determination of position may be communicated by mobile device 10, for example, when navigation applications are desired. Alternatively, the request for determination of position may be communicated by application server 11 remote from mobile device 10, for example, when a parent desires to determine the position of their child.

At step S2, mobile device 10 determines that position information of mobile device 10 is not available via GPS, including A-GPS. Such a determination, for example, may involve an initial attempt to acquire GPS satellite signals and a recognition of failure in response to an inability to acquire signals from an adequate number of satellites within a particular time period.

At optional step S3, either before, after, or concurrent with step S2, mobile device 10 detects a signal from any access point(s) within range and obtains the address of the access point from the detected signal from the access point. Mobile device 10 may then transmit the address to Wi-Fi positioning server 22

At step S4, Wi-Fi positioning server 22 determines, based on an address of the access point, that the access point is not available in a location information database.

At step S5, location server 16 obtains, from mobile device 10, information about signals of base stations 18 of mobile communications network 20. The information may include information about base stations 18 currently detectable by mobile device 10, such as identifications of currently detectable base stations 18, and/or signal strength of each signal received from a respective one of base stations 18.

At step S6, network server 12 processes information about the signals of base stations 18 of mobile communication network to determine the position of mobile device 10. Network server 12 may process the information using AFLT/ECID/OTDOA, based on the signals from base stations 18, and determines the position of mobile device 10. In this example, the network server 12 provides the determined position data to the location agent running on the mobile device 10, and the location agent sends the position data with the Wi-Fi access point MAC address and signal strength to location server 16.

At step S7, location server 16 stores the determined position of mobile device 10 in a location information database in association with an address of Wi-Fi access point 14, to indicate position of Wi-Fi access point 14. The determined position may be stored in the location information database as coordinates of latitude and longitude, or any other indicator of position.

At optional step S8, network server 12 transmits the determined position information of mobile device 10 to the party requesting such information. For example, position information may be transmitted to mobile device 10, for use by the custodian thereof, or position information may be transmitted to a workstation or other display of a parent who requested position information for mobile device 10. The information may then be displayed on mobile device 10 or other display.

Such display may include a street address, a map display, coordinates of latitude and longitude, or any other output indicative of position.

As shown by the discussion above, the technique for obtaining information as to position of a wireless local area network access point may be implemented on appropriately configured hardware operating as one or more of the above-discussed servers. As is known in the art, a server may be implemented by appropriate server application programming of a general purpose computer connected for network communications.

Figure 4:
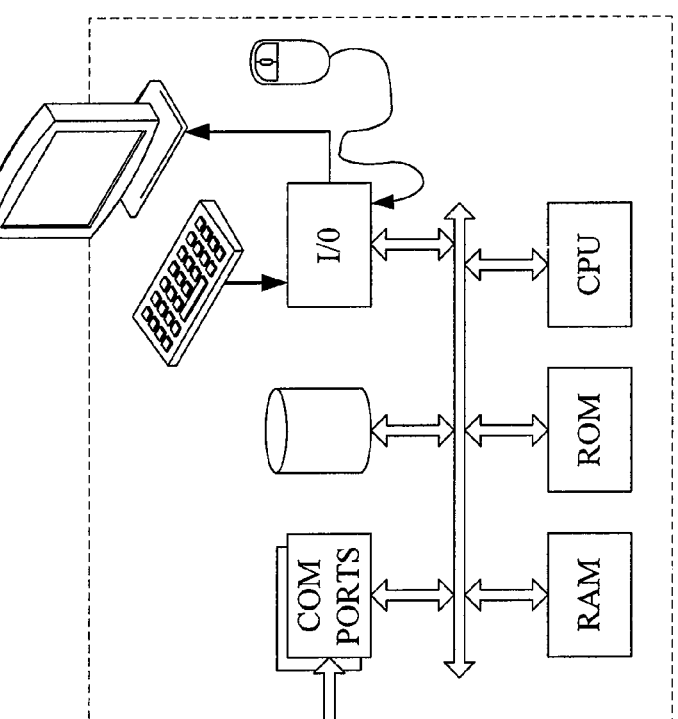
FIG. 4 is a simplified functional block diagram of a personal computer or other work station or terminal device.
Figure 3:
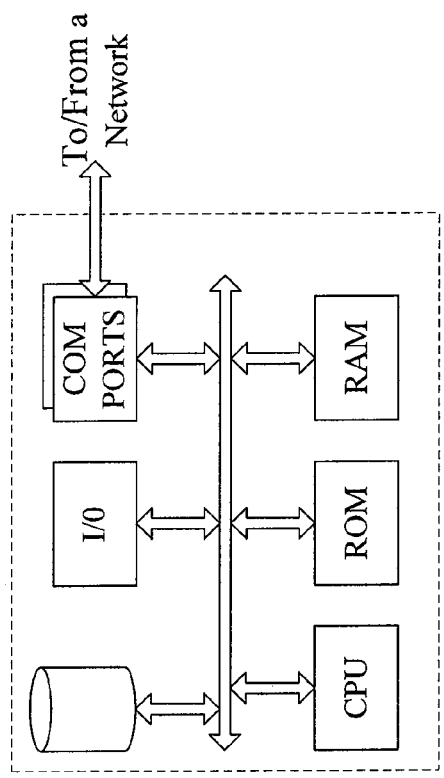
FIG. 3 is a simplified functional block diagram of a computer that may be configured as a host or server.

FIGS. 3 and 4 provide functional block diagram illustrations of general purpose computer hardware platforms. FIG. 3 illustrates a network or host computer platform, as may typically be used to implement a server. FIG. 4 depicts a computer with user interface elements, as may be used to implement a personal computer or other type of work station or terminal device, although the computer of FIG. 4 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. The server functions may be implemented in a distributed fashion on a number of similar platforms, to distribute processing load.

Hence, aspects of the methods of obtaining information as to position of a wireless local area network access point outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platform of the appropriate server device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the server or mobile devices, etc. shown in the drawings. Volatile storage media include dynamic memory, such as main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during RF and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used by way of example in the detailed description above.

3GPP2—3rd Generation Partnership Project 2
AFLT—Advanced Forward Link Trilateration
A-GPS—Assisted GPS
BSA—Base Station Almanac
BSC—Base Station Controller
BTS—Base Transceiver System
CDMA—Code Division Multiple Access
CD-ROM—Compact Disc Read Only Memory
CPU—Central Processing Unit
DVD—Digital Video Disc
DVD-ROM—Digital Video Disc Read Only Memory
ECID—Enhanced Cell Identification
ENODEB—Evolved Node B
EPROM—Erasable Programmable Read Only Memory
EVDO—Evolution Data Optimized
FLASH-EPROM—Flash Erasable Programmable Read Only Memory
GPS—Global Positioning Satellite System
GSM—Global System for Mobile
IP—Internet Protocol
IR—Infrared LTE—Long Term Evolution
MAC—Media Access Control
MSC—Mobile Switching Center
OTDOA—Observed Time Difference of Arrival
PC—Personal Computer
PDE—Position Determining Entity
PDSN—Packet Data Serving Node
PGW—Packet Data Network Gateway
PROM—Programmable Read Only Memory
PSTN—Public Switched Telephone Network
RAM—Random Access Memory
RAN—Radio Access Network
RF—Radio Frequency
RNC—Radio Network Controller
RSSI—Received Signal Strength Indicator
SMS—Short Messaging Service
SUPL—Secure User Plane Location
TDMA—Time Division Multiple Access
UDP—User Datagram Protocol
WAN—Wide Area Network
WLAN—Wireless Local Area Network

What is claimed is:

1. A method comprising steps of:
receiving a request for a determination of a position of a mobile device when the mobile device is in the vicinity of a wireless local area network access point;
obtaining an address of the wireless local area network access point from a signal detected from the wireless local area network access point;
determining, based on the address of the wireless local area network access point, that position information of the access point is not available in a location information database;
determining that position information of the mobile device is not available via a global positioning system (GPS);
after the determinations that both position information of the wireless local area network access point and GPS position information of the mobile device are not available, obtaining from the mobile device, information about signals of base stations of a mobile communication network currently detectable by the mobile device;
processing the information about the signals to determine the position of the mobile device; and
storing the determined position of the mobile device in a location information database in association with the address of the wireless local area network access point, to indicate a position of the wireless local area network access point.

2. The method of claim 1, wherein the information about the signals of the base stations comprises:
identifications of the currently detectable base stations; and
signal strength of each signal received from a respective one of the base stations.

3. The method of claim 1, wherein the request for determination of position of the mobile device relates to a location based service offered through a wide area mobile communication network.

4. The method of claim 1, wherein processing the information comprises advanced forward link trilateration (AFLT) based on the signals from the base stations.

5. The method of claim 1, wherein processing the information comprises observed time difference of arrival (OTDOA).

6. The method of claim 1, wherein processing the information comprises enhanced cell identification (ECID).

7. The method of claim 1, wherein the request for determination of position is communicated by the mobile device.

8. The method of claim 1, wherein the request for determination of position is communicated by an application server remote from the mobile device.

9. The method of claim 1, further comprising the step of:
transmitting the determined position information of the mobile device to the mobile device.

10. The method of claim 1, wherein the determined position is stored in the location information database as latitude and longitude coordinates.

11. The method of claim 1, wherein the wireless local area network comprises a Wi-Fi access point.

12. An article of manufacture, comprising programming instructions for causing a processor of one or more servers to perform the method of claim 1 and a non-transitory machine readable storage medium bearing the programming instructions.

13. A system comprising at least one server, the at least one server comprising:
an interface for communication through a mobile communication network;
a processor for controlling operations of the at least one server, including communications through the interface;
a storage for records and programming executable by the processor, wherein the programming configures the processor so that the system implements functions including functions to:
receive a request for determination of position of a mobile device when the mobile device is communicating via a wireless local area network access point;
obtain an address of the wireless local area network access point from a signal detected from the wireless local area network access point;
determine, based on the address of the wireless local area network access point, that position information of the access point is not available in a location information database;
determine that position information of the mobile device is not available via a global positioning system (GPS);
after the determinations that both position information of the wireless local area network access point and GPS position information of the mobile device are not available, obtain from the mobile device information about signals of base stations of the mobile communication network currently detectable by the mobile device;
process the information about the signals of the base stations of the mobile communication network currently detectable by the mobile device, to determine the position of the mobile device; and
store the determined position of the mobile device in a location information database in association with an address of the access point, to indicate position of the access point.

14. The system of claim 13, wherein the information about the signals of the base stations comprises:
identifications of the currently detectable base stations; and
signal strength of each signal received from a respective one of the currently detectable base stations.

15. The system of claim 13, wherein the function to process the information is a processing function selected from the group consisting of: advanced forward link trilateration (AFLT), observed time difference of arrival (OTDOA), and enhanced cell identification (ECID).

* * * * *